United States Patent
Bohm et al.

(10) Patent No.: US 9,983,952 B2
(45) Date of Patent: May 29, 2018

(54) RECOVERY OF LOCAL RESOURCE

(71) Applicant: INTERNATIONAL BUSINESS MACHINES CORPORATION, Armonk, NY (US)

(72) Inventors: Fraser P. Bohm, Hursley (GB); Guo Q. Li, Beijing (CN); Ian J. Mitchell, Hursley Park (GB); Andrew D. Wharmby, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 14/964,974

(22) Filed: Dec. 10, 2015

(65) Prior Publication Data

US 2016/0179633 A1 Jun. 23, 2016

(30) Foreign Application Priority Data

Dec. 22, 2014 (GB) .................................. 1422923.1

(51) Int. Cl.
*G06F 11/00* (2006.01)
*G06F 11/14* (2006.01)

(52) U.S. Cl.
CPC ...... *G06F 11/1474* (2013.01); *G06F 11/1441* (2013.01); *G06F 11/1471* (2013.01); *G06F 2201/86* (2013.01); *G06F 2201/87* (2013.01)

(58) Field of Classification Search
CPC ................................................. G06F 11/1474
See application file for complete search history.

(56) References Cited

U.S. PATENT DOCUMENTS

| | | | |
|---|---|---|---|
| 5,247,664 A | 9/1993 | Thompson et al. | |
| 6,895,529 B2 * | 5/2005 | Egolf | G06F 11/1474 714/15 |
| 7,430,740 B1 * | 9/2008 | Molloy | G06F 9/466 707/999.001 |
| 7,448,035 B2 * | 11/2008 | Dorrance | G06F 17/30371 707/999.201 |
| 7,730,489 B1 | 6/2010 | Duvur et al. | |
| 7,814,065 B2 | 10/2010 | Chan et al. | |
| 7,991,971 B2 * | 8/2011 | Groff | G06F 11/1471 711/111 |
| 8,140,483 B2 | 3/2012 | Mitchell et al. | |
| 8,336,053 B2 | 12/2012 | Burghard et al. | |
| 9,459,971 B1 * | 10/2016 | Havemose | G06F 11/1448 |
| 2002/0083078 A1 | 6/2002 | Pardon et al. | |
| 2003/0154423 A1 | 8/2003 | Egolf et al. | |

(Continued)

FOREIGN PATENT DOCUMENTS

CN 101853186 10/2010

*Primary Examiner* — Christopher McCarthy
(74) *Attorney, Agent, or Firm* — Heslin Rothenberg Farley & Mesiti P.C.

(57) ABSTRACT

A method, system, and computer program product that includes a processor cataloging a current resource definition and a current transaction state for the resource. The processor recovers the resource and a transaction state for the resource after an emergency restart, by utilizing the current resource definition and the current transaction state, wherein the recovering comprises recovering transactions of the resource. The processor completes or backs out of the transactions. The processor closes the resource and the processor recovers the resource by utilizing a global catalog.

19 Claims, 4 Drawing Sheets

(56) References Cited

U.S. PATENT DOCUMENTS

| | | | |
|---|---|---|---|
| 2005/0289212 A1* | 12/2005 | Tankov | G06F 9/466 709/200 |
| 2007/0072163 A1* | 3/2007 | Groff | G06F 11/1471 434/322 |
| 2007/0220328 A1* | 9/2007 | Liu | G06F 11/1435 714/24 |
| 2009/0193286 A1 | 7/2009 | Brooks et al. | |
| 2010/0191706 A1* | 7/2010 | Newport | G06F 17/30368 707/648 |
| 2012/0167098 A1 | 6/2012 | Lee et al. | |
| 2013/0246368 A1 | 9/2013 | Parkinson et al. | |
| 2015/0286496 A1* | 10/2015 | Jenkinson | G06F 9/466 718/101 |
| 2016/0062852 A1* | 3/2016 | Maple | G06F 11/2028 714/19 |
| 2016/0294726 A1* | 10/2016 | Parkinson | G06F 9/466 |
| 2016/0380829 A1* | 12/2016 | Morgan | H04L 41/12 709/226 |

* cited by examiner

Local Resource Recovery Module 200

Local Catalog 202

Local recovery engine 204

Resource Resolver 206

Global recovery engine 208

Local Resource Recovery Method 300

FIGURE 2

RECOVERY OF LOCAL RESOURCE

PRIOR FOREIGN APPLICATION

This application claims priority from United Kingdom (GB) patent application number 1422923.1 filed Dec. 22, 2014, which is hereby incorprated herein by reference in its entirety.

BACKGROUND

Transaction processing is a style of computing, typically performed by large server computers, that supports interactive applications. In transaction processing, work is divided into individual, indivisible operations, called transactions. By contrast, batch processing is a style of computing in which one or more programs processes a series of records (a batch) with little or no action from the user or operator. A transaction application is a collection of programs that together perform a business operation. Each program runs as part of a transaction under transaction system control using transaction services and interfaces to access resources.

Every resource is defined with a set of attributes. The attributes are the properties of the resource, telling the transaction system, for example, whether a file can be updated, the security level that should be given to a transaction, and/or the remote systems with which the transaction system can communicate. Transaction system applications and the resources they use can be distributed in and between interconnected transaction regions.

An important aspect of transaction systems and resources is the ability to recover and restart in the middle of transaction processing.

SUMMARY

Shortcomings of the prior art are overcome and additional advantages are provided through the provision of a computer program product for recovering a resource. The computer program product comprises a storage medium readable by a processing circuit and storing instructions for execution by the processing circuit for performing a method. The method includes, for instance: cataloging, by a processor, a current resource definition and a current transaction state for the resource; recovering, by the processor, the resource and a transaction state for the resource after an emergency restart, by utilizing the current resource definition and the current transaction state, wherein the recovering comprises recovering transactions of the resource; completing or backing out, by the processor, of the transactions; closing, by the processor, the resource; and recovering, by the processor, the resource by utilizing a global catalog.

Shortcomings of the prior art are overcome and additional advantages are provided through the provision of a method for recovering a resource. The method includes, for instance: cataloging, by a processor, a current resource definition and a current transaction state for the resource; recovering, by the processor, the resource and a transaction state for the resource after an emergency restart, by utilizing the current resource definition and the current transaction state, wherein the recovering comprises recovering transactions of the resource; completing or backing out, by the processor, of the transactions; closing, by the processor, the resource; and recovering, by the processor, the resource by utilizing a global catalog.

Shortcomings of the prior art are overcome and additional advantages are provided through the provision of a system to recover a resource. The system includes a memory, one or more processor in communication with the memory, and program instructions executable by the one or more processor via the memory to perform a method. The method includes, for instance cataloging, by a processor, a current resource definition and a current transaction state for the resource; recovering, by the processor, the resource and a transaction state for the resource after an emergency restart, by utilizing the current resource definition and the current transaction state, wherein the recovering comprises recovering transactions of the resource; completing or backing out, by the processor, of the transactions; closing, by the processor, the resource; and recovering, by the processor, the resource by utilizing a global catalog.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2 is a component diagram depicting aspects of some embodiments of the present invention;

DETAILED DESCRIPTION

Figure 1:
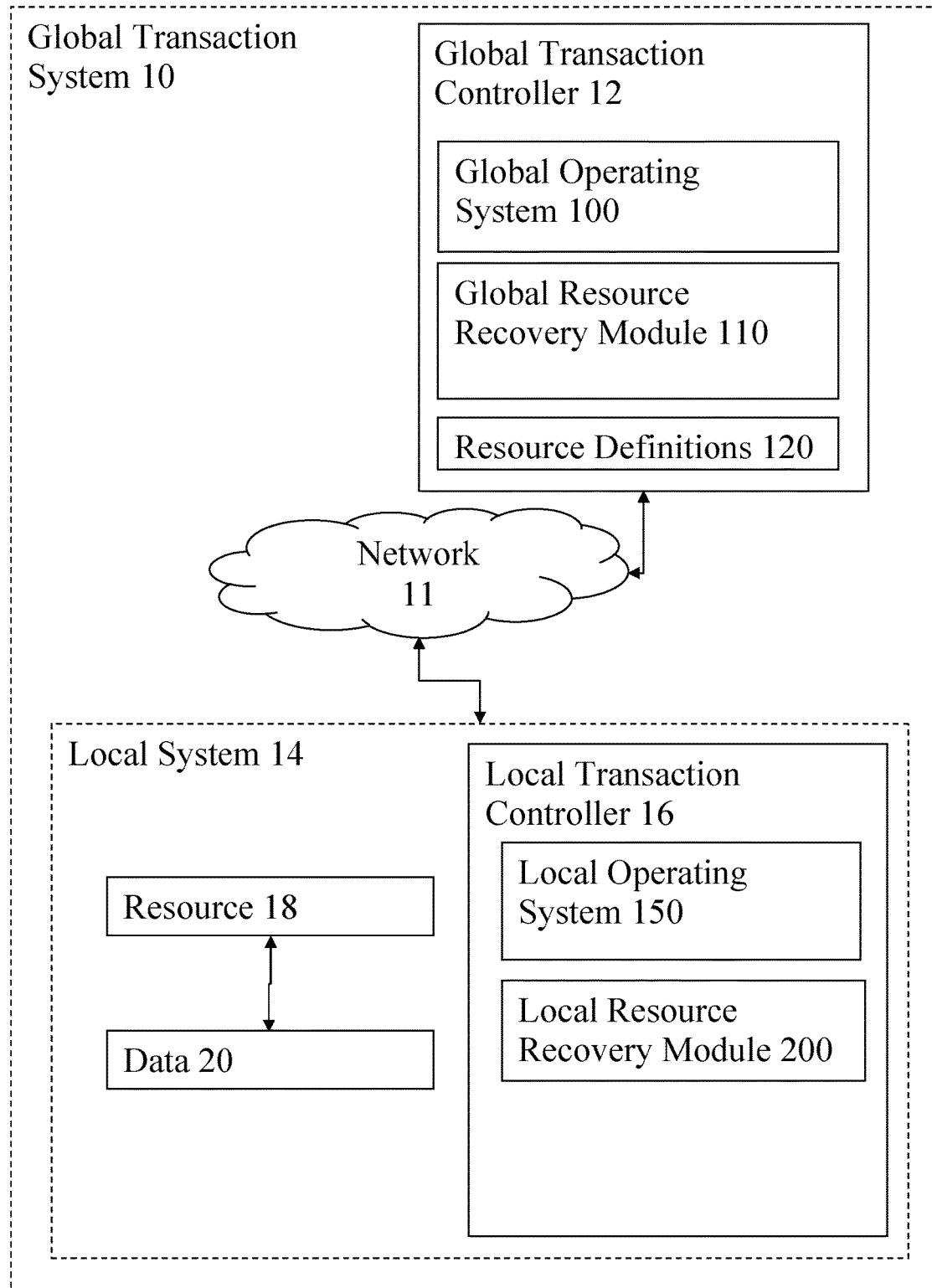
FIG. 1 is a deployment diagram depicting an aspect of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Embodiments of the present invention relate to a method and apparatus for recovery of local resource. In particular, some embodiments of the present invention relate to a method and apparatus for recovery of local resource in a distributed transaction processing network.

A transaction system continually records information about the state of the region and about the state of each resource in the region. This information is preserved and used when a region is restarted, thus enabling the transaction system to restart with no loss of data integrity. If the transaction system shuts down leaving any resource with work in-flight, the resource is backed out when the transaction system restarts and locks held by this resources are released.

A transaction system resource can shut down in several ways.

A normal (or warm) shutdown occurs when the transaction resource shuts down in response to a transaction system management command. All transactions that have already started continue to run, and the transaction resource waits indefinitely until they are complete. Long-running transactions can cause an unacceptable delay, or require intervention by the operator.

An immediate shutdown occurs when the transaction resource shuts down in response to a transaction system management command. All transactions are purged from the system; units of work are not backed out, and locks are not released, until the resource restarts.

An abnormal shutdown occurs when the transaction resource shuts down in response to an unrecoverable error, in response to a request from the operating system (arising, for example, from a program check or system abend), or following a machine check or power failure. In an abnormal shutdown, a transaction resource might not be able to perform any shutdown processing.

Depending on whether the resource has been started and shut down in the past, and on the way it was shut down, a transaction resource can start in several ways.

The transaction resource can start with an initial start whereby the transaction resource starts with no reference to any previous activity. You perform an initial start when starting a new transaction resource for the first time.

The transaction resource can start with a cold start whereby the transaction resource starts and restores recovery information that relates to systems and resource managers that were connected when the resource shut down. It does not recover its transaction state.

The transaction resource can start with a warm restart whereby a warm restart follows a normal shutdown and restores the resource to its state it was in when shutdown completed.

The transaction resource can start with an emergency restart whereby an emergency restart follows an immediate or abnormal shutdown of the transaction resource. During an emergency restart, the transaction processing system backs out any transactions that were in-flight at the time of shutdown and thus frees any locks that were held at protecting resources.

In normal operation, when a transaction resource starts, it examines the information recorded before the resource last shut down to determine in which way to start.

A local transaction system controller allows transaction resources to be defined once, managed centrally, and deployed to one or more regions of transaction processing. Such a controller allows operational changes to be made either to individual regions or across the platform, but when regions start they always get the latest definition. However, some in flight updates to data sources, for example, databases or files, must be recovered locally. Unfortunately this can happen during a restart of a region and before a centrally managed definition is deployed. CICS™ Transaction Server is the general-purpose transaction processing software of International Business Machines Corporation (IBM®) for general-purpose transaction processing software for z/OS® and CICSPlex® System Manager is a regional transaction system controller. IBM®, CICS™ CICSPLEX® and z/OS® are registered and/or unregistered trademarks of International Business Machines Corporation in the US and/or other countries.

Resources installed from a central location are cataloged and their state recovered when a region restarts, it happens before any attempt to recover data. However, such a mechanism cannot be consistently applied across all resources, such as, for example, an event processor where definitions are more complex or may change while a region is down. Therefore central recovery leads to the "cold start" problem where a fresh resource does not work properly because it is not exactly the same resource and certain data cannot be recovered globally.

Referring to FIG. 1, the deployment of aspects of some embodiments of the present invention in a distributed transaction system 10 are described. Distributed transaction system 10 comprises a global transaction controller 12 and a network 11 of at least one local system 14. Local system 14 comprises: local transaction controller 16, at least one resource 18, and some data 20.

An embodiment of the present invention includes a system 10 that is a transaction system and controllers 12 and 16 that are transaction controllers, but other embodiments of the present invention are envisaged where system 10 is a general computing system and controllers 12 and 16 are general data processors.

In some embodiments of the present invention, system 10 is operational with numerous general purpose or special purpose computing system environments or configurations that could act as controllers. Examples of well-known computing processing systems, environments, and/or configurations that may be suitable for use with system 10 as transaction controllers include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems.

System and controllers may be described in the general context of computer system-executable instructions, such as program modules, being executed by a computer processor. Generally, program modules may include routines, programs, objects, components, logic, and data structures that perform particular tasks or implement particular abstract data types.

In an embodiment of the present invention, a controller comprises: a general-purpose computer server and one or more input devices and output devices directly attached to the computer server. A controller may communicate with a user using input devices and output devices. Input devices include one or more of: a keyboard, a scanner, a mouse, a trackball or another pointing device. Output devices include one or more of a display or a printer. A controller communicates with network devices (not shown) over network 11. Network 11 can be a local area network (LAN), a wide area network (WAN), a high speed data network or the Internet.

In an embodiment of the present invention, a computer controller comprises: central processing unit (CPU), network adapter, device adapter, a bus and a memory (not shown).

A CPU loads machine instructions from memory and performs machine operations in response to the instructions. Such machine operations include: incrementing or decrementing a value in a register; transferring a value from memory to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to as a low level language. A computer program written in a high level language needs to be compiled to a machine code program before it can be run. Alternatively a machine code program such as a virtual machine or an interpreter can interpret a high level language in terms of machine operations.

A network adapter may be connected to the bus and network 11 for enabling communication between the computer controllers.

Memory includes computer system readable media in the form of volatile memory and non-volatile or persistent memory. Examples of volatile memory are random access memory (RAM) and cache memory. Examples of persistent memory are read only memory (ROM) and erasable programmable read only memory (EPROM). Generally volatile memory is used because it is faster and generally non-volatile memory is used because it will hold the data for longer. A controller may further include other removable and/or non-removable, volatile and/or non-volatile computer system storage media. By way of example, only persistent memory can be provided for reading from and writing to a non-removable, non-volatile magnetic media (not shown and typically a magnetic hard disk or solid-state drive). Memory may include at least one program product having a set (for example, at least one) of program modules that are configured to carry out the functions of embodiments of the invention.

The set of program modules configured to carry out the functions of the global controller 12 in some embodiments of the present invention comprises: global operating system 100, global resource recovery module 110 and global resource definitions 120.

The set of program modules configured to carry out the functions of the local transaction controller 16 in some embodiments of the present invention comprises: local operating system 150, local resource definitions 160, and local resource recovery module 200.

Further program modules that support the aspects of some embodiment of the present invention, but are not shown include firmware, boot strap program, and support applications. In one embodiment of the present invention, ROM in the memory stores the modules to enables the local controller to function as a special purpose computer that performs certain aspects of some embodiments of the present invention.

Referring to FIG. 2, a component diagram depicting aspects of some embodiments of the present invention, local resource recovery module 200 comprises the following components: local catalog 202; local recovery engine 204, resource resolver 206; global recovery engine 208; and local resource recovery method 300.

In an embodiment of the present invention, local catalog 202 catalogs a recoverable resource in the region of the local resource recovery module.

In an embodiment of the present invention, local recovery engine 204 recovers, on an emergency restart, the resource as defined in the catalog and with respect data states as defined in the catalog.

In an embodiment of the present invention, resource resolver 206 closes the recovered resource after the resource has recovered its data state and then completed and/or backed out of any transactions.

In an embodiment of the present invention, global recovery engine 208 recovers the resource as defined in a global catalog.

Figure 3:
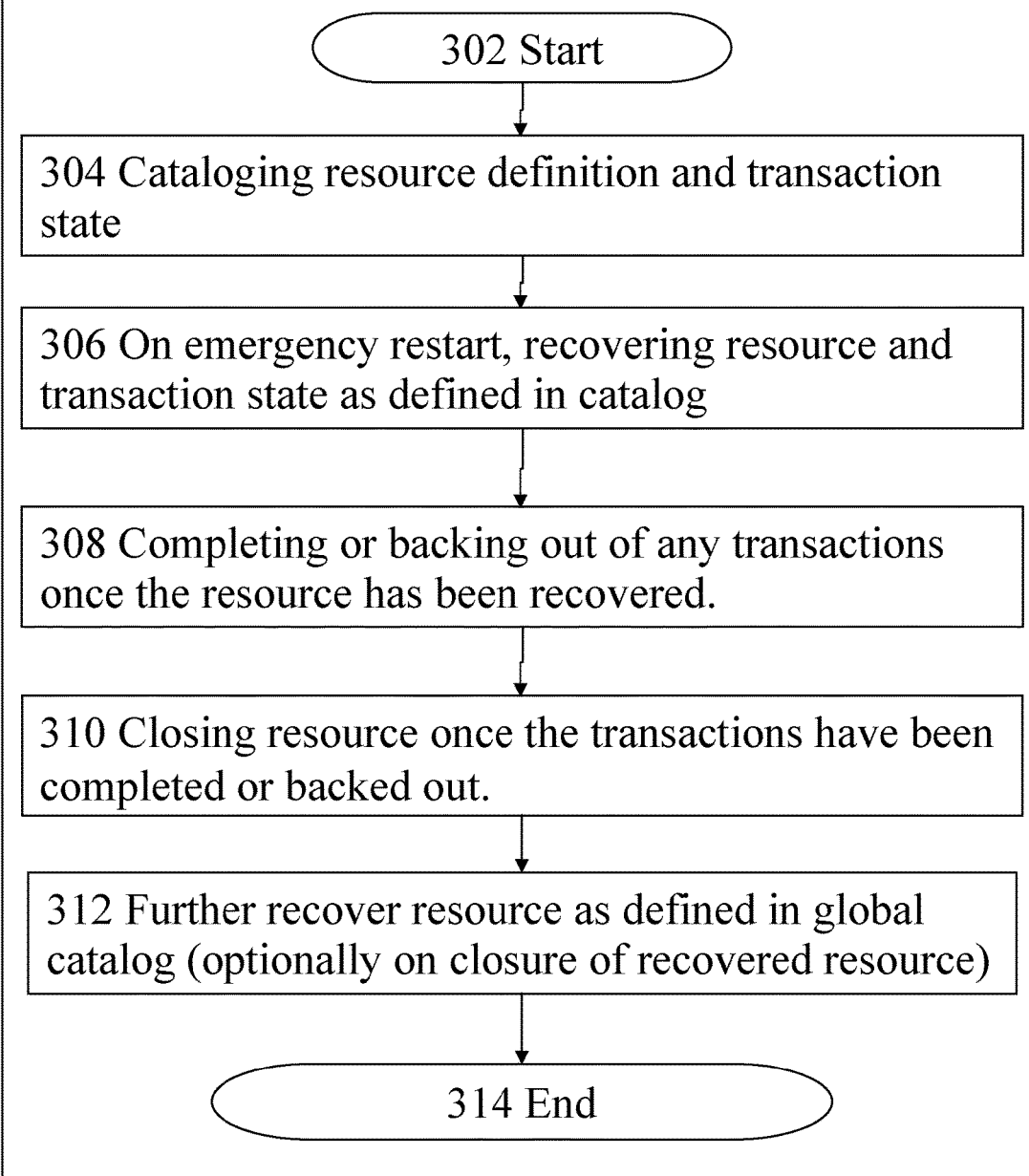
FIG. 3 is a flow diagram depicting a process comprising aspects of some embodiments of the present invention.

FIG. 3 is a flow diagram depicting aspects of some embodiments of the present invention which include a local resource recovery method 300, which is described below with respect to FIG. 3.

Referring to FIG. 3, local resource recovery method 300 comprises logical process aspects 302 to 314, which are parts of a process that may comprise program code executed by a processing resource in a computing environment.

In an embodiment of the present invention, aspect 302 starts a method based on a selection of an administrator.

In an embodiment of the present invention, aspect 304 catalogs a resource definition and transaction state, the resource being in the region of the local resource recovery module.

In an embodiment of the present invention, aspect 306 recovers, on an emergency restart, the resource as defined in the catalog and respective transaction states as defined in the catalog.

In an embodiment of the present invention, aspect 308 completes or backs out of any transactions once the resource has been recovered with respective a transaction state.

In an embodiment of the present invention, aspect 310 closes the resource once the transaction has been completed or backed out.

In an embodiment of the present invention, aspect 312 recovers the resource as defined in a global catalog. As denoted in the figure, (i.e., "optionally on closure of recovered resource"), in an embodiment of the present invention, the recovering the resource as defined in the global catalog may be timed to occur upon closure of the recovered resource.

In an embodiment of the present invention, aspect 314 represents the end of local resource recover method 300.

Figure 4:
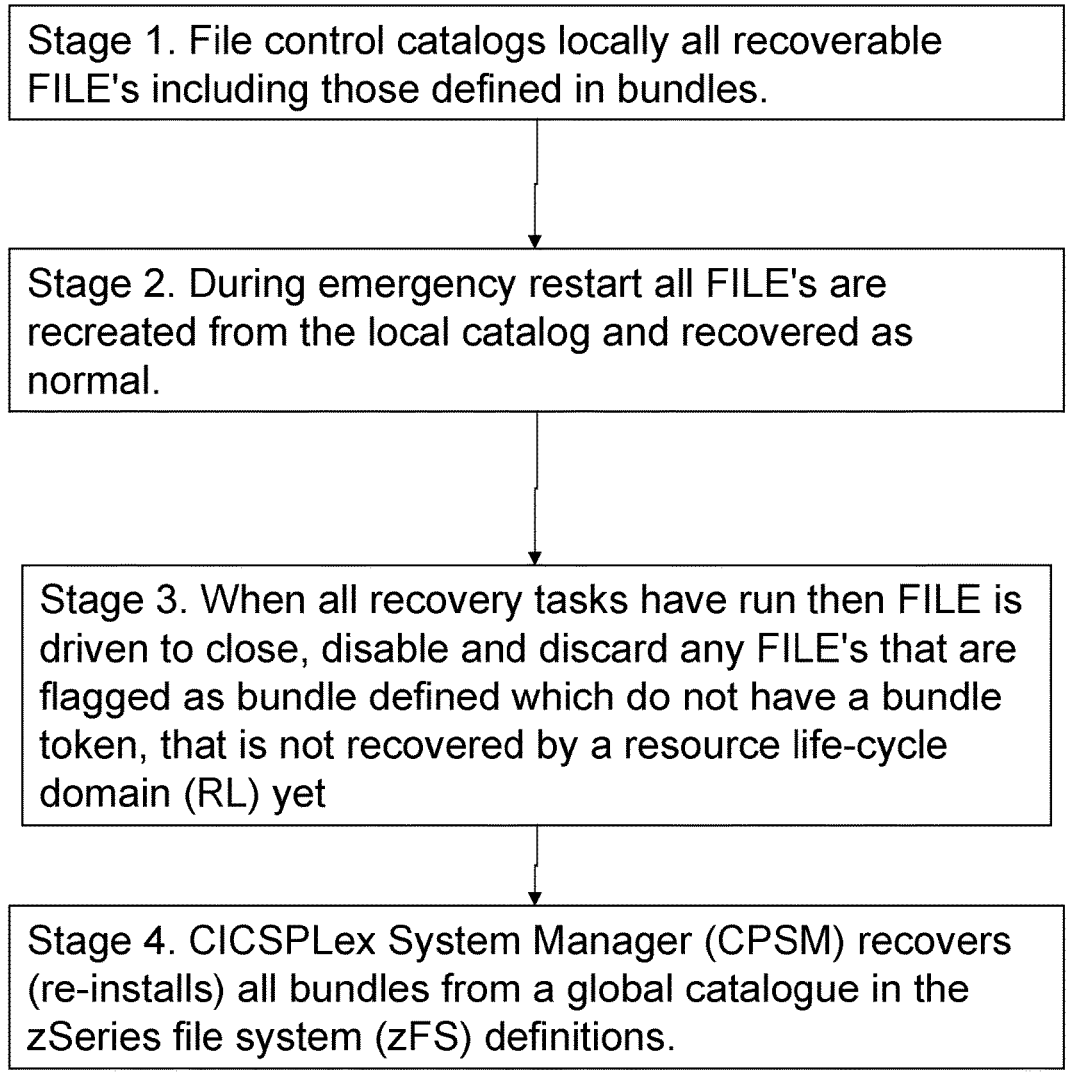
FIG. 4 illustrates an example of an embodiment of the present invention.

Referring to FIG. 4, an example an embodiment of the present invention is now described.

In an embodiment of the present invention, recoverable resources include a file (referred as FILE below) installed using a CICS bundle that is part of a platform (or an application) that are locally cataloged as for CICS definition file (CSD) and CICSPlex® System Manager data repositories (DREP) definitions. When a region starts normally the local catalog is ignored and the resource is created from the global catalog. However, if the region is emergency restarted the resource and any in flight data changes are recovered from the local catalog. When the resource definition is later received in the global catalog then it replaces the one recovered from the local catalog. If there is a discrepancy, then the resource is unusable, and the region must be restarted normally.

This approach enables resource definitions to be maintained centrally and created consistently across the platform while allowing in flight updates to be resolved after a failure. The "cold start" problem is avoided because all regions receive the same well defined configuration and operational changes are ignored.

The flow stages of the example are as follows:

Stage 1. File control catalogs locally recoverable FILEs including those defined in bundles.

Stage 2. During emergency restart, FILEs are recreated from the local catalog and recovered as normal.

Stage 3. When all recovery tasks have run then FILE is driven to close, disable and discard any FILEs that are flagged as bundle defined, which do not have a bundle token, that are not recovered by a resource life-cycle domain (RL)

yet. The close, disable and discard of a file will fail if that file has not yet completed recovery. A message is output to a user advising the user to clean up once recovery is complete.

Stage 4. CICSPlex® System Manager (CPSM) recovers (re-installs) all bundles from a global catalog in the zSeries file system (zFS) definitions. For files that are not deleted at stage 3, there is a name clash and message. Bundle parts will be set as UNUSABLE.

In one aspect of the an embodiment of the present invention, there is provided a system for recovering a resource in a distributed transaction resource system having a global resource catalog, the system comprising: a local catalog for cataloging the current resource definition and transaction state; a local recovery engine for recovering resource and transaction state after an emergency restart as defined by the cataloged resource definition and cataloged transaction state; a resource resolver for completing or backing out of any recovered transactions; and a global recovery engine for further recovering the resource as defined in a global catalog.

In another aspect of an embodiment of the present the invention, there is provided a method for recovering a resource in a distributed transaction resource system having a global resource catalog, the method comprising: cataloging the current resource definition and transaction state; recovering resource and transaction state after an emergency restart, as defined by the cataloged resource definition and cataloged transaction state; completing or backing out of any recovered transactions; closing the recovered resource; and further recovering the resource as defined in a global catalog.

In an embodiment of the present invention, the transaction state is any type of resource data state that may be recovered.

An embodiment of the present invention may also include indicating to a global controller that the resource is being recovered with a transaction state.

An embodiment of the present invention may also include indicating to a global controller that the resource has been recovered with a transaction state.

An embodiment of the present invention may also include indicating to a global controller that a recovered transaction state has been completed or backed out of.

An embodiment of the present invention may also include waiting until the original resource has closed before recovering the resource as defined by the global catalog.

An embodiment of the present invention may also include recovering an additional resource as defined by the global catalog in parallel with recovering the resource and transaction state.

An embodiment of the present invention may also include recovering the resource as defined in the global catalog if the resource is flagged otherwise not recovering the resource as defined in the global catalog. Typically the resource is flagged as bundle defined.

In an embodiment of the present invention, the closing of a recovered resource and transaction state will not proceed if the resource does not completely recover, optionally a message is output informing a user of the need to clean up redundant resources once the global recovery is complete.

In an further aspect of an embodiment of the present the invention there is provided a method for recovering a resource in a distributed transaction resource system having a global resource catalog, the method comprising: requesting cataloging of the executing resource definition and transaction state; requesting an emergency restart of the resource; requesting recovery of resource and transaction state as defined by the cataloged definition and cataloged transaction state when transaction resource system has restarted; requesting completion or back out of any recovered transactions when the resource and transaction is ready; and requesting further recovery of the resource as defined in the global catalog when the transaction has completed or backed down.

Some of the embodiments of the present invention have a recovery effect on a transaction process carried on outside the local resource controller. Some embodiments have an effect that operates at a machine and/or system level of a resource controller and below any application level on a transaction system. Some embodiments provide for resource controllers being made to operate in a new way. Some embodiments have a recovery effect that leads to an increase in the reliability of the transaction system.

A further aspect of some embodiments of the present the invention include a computer program product for recovering a resource in a distributed transaction resource system having a global resource catalog, the computer program product comprising a computer-readable storage medium having computer-readable program code embodied therewith and the computer-readable program code configured to perform the method.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to, optical or analogue communications lines, or intangibly using wireless techniques, including but not limited to, microwave, infrared or other transmission techniques. The series of computer readable instructions may embody all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Another aspect of some embodiments of the present invention includes a computer program stored on a computer readable medium and loadable into the internal memory of a computer, comprising software code portions, when the program is run on a computer, for performing the method described herein.

Another aspect of some embodiments of the present invention includes a data carrier aspect that comprises functional computer data structures to, when loaded into a computer system and operated upon thereby, enable the computer system to perform a method. In an embodiment of the present invention, a data-carrier may be a solid-state memory, magnetic drive or optical disk. Channels for the transmission of data may likewise comprise storage media of all descriptions as well as signal-carrying media, such as wired or wireless signal-carrying media.

Further embodiments of the invention are now described. It will be clear to one of ordinary skill in the art that some or all the aspects described may be embodied in a logic apparatus, or a plurality of logic apparatuses, comprising logic elements arranged to perform aspects of the method and that such logic elements may comprise hardware components, firmware components or a combination thereof.

It will be equally clear to one of skill in the art that all or part of the logic components of some embodiments of the present invention may be embodied in a logic apparatus comprising logic elements to perform aspects of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further embodiment, the present invention may be realized in the form of a computer implemented method of deploying a service comprising deploying computer program code operable to, when deployed into a computer infrastructure and executed thereon, cause the computer system to perform aspects of the method.

It will be appreciated that the method and components of the some embodiments of the present invention may be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer-implemented method comprising:
    cataloging, by a processor, a current resource definition and a current transaction state for a resource;
    recovering, by the processor, the resource and a transaction state for the resource after an emergency restart subsequent to one of an immediate shutdown or an abnormal shutdown of the resource, by utilizing the current resource definition and the current transaction state, wherein the recovering comprises recovering transactions of the resource;
    completing or backing out of, by the processor, the transactions;
    closing, by the processor, the resource, comprising:
        verifying, by the processor, that the resource and the transaction state were recovered by utilizing the current resource definition and the current transaction state; and
        based on the verifying, closing the resource; and
    recovering, by the processor, the resource by utilizing a global catalog.

2. The computer-implemented method of claim 1, wherein the transaction state is any type of resource data state that may be recovered by the processor.

3. The computer-implemented method of claim 1, further comprising:
    indicating, by the processor, to a global controller that the resource is being recovered utilizing the current transaction state.

4. The computer-implemented method of claim 1, further comprising:
    indicating, by the processor, to a global controller that the resource has been recovered utilizing the current transaction state.

5. The computer-implemented method of claim 1, further comprising:
    indicating, by the processor, to a global controller that the transactions have been completed or backed out of.

6. The computer-implemented method of claim 1, wherein the recovering the resource by utilizing a global catalog comprises:
    obtaining, by the processor, an indication that the resource has closed; and
    based on the obtaining, recovering, by the processor, the resource by utilizing a global catalog.

7. The computer-implemented method of claim 1, further comprising:
    recovering, by the processor, an additional resource by utilizing the global catalog in parallel with the recovering the resource and the transaction state by utilizing the current resource definition and the current transaction state.

8. The computer-implemented method of claim 1, the recovering the resource by utilizing a global catalog comprising:
    obtaining, by the processor, an indicator associated with the resource; and
    based on obtaining the indicator, recovering the resource by utilizing a global catalog.

9. The computer-implemented method of claim 1, further comprising:
    obtaining, by the processor, an indication that the recovering the resource by utilizing the global catalog is complete; and
    generating, by the processor, a message.

10. A computer program product comprising:
    a non-transitory computer readable storage medium readable by a processor and storing instructions for execution by the processor for performing a method comprising:
        cataloging, by the processor, a current resource definition and a current transaction state for a resource;
        recovering, by the processor, the resource and a transaction state for the resource after an emergency restart subsequent to one of an immediate shutdown or an abnormal shutdown of the resource, by utilizing the current resource definition and the current transaction state, wherein the recovering comprises recovering transactions of the resource;
        completing or backing out of, by the processor, the transactions;
        closing, by the processor, the resource, comprising:
            verifying, by the processor, that the resource and the transaction state were recovered by utilizing the current resource definition and the current transaction state; and
            based on the verifying, closing the resource; and
        recovering, by the processor, the resource by utilizing a global catalog.

11. The computer program product of claim 10, wherein the transaction state is any type of resource data state that may be recovered by the processor.

12. The computer program product of claim 10, the method further comprising:
    indicating, by the processor, to a global controller that the resource is being recovered utilizing the current transaction state.

13. The computer program product of claim 10, the method further comprising:
    indicating, by the processor, to a global controller that the resource has been recovered utilizing the current transaction state.

14. The computer program product of claim 10, the method further comprising:

indicating, by the processor, to a global controller that the transactions have been completed or backed out of.

15. The computer program product of claim 10, wherein the recovering the resource by utilizing a global catalog comprises:
   obtaining, by the processor, an indication that the resource has closed; and
   based on the obtaining, recovering, by the processor, the resource by utilizing a global catalog.

16. The computer program product of claim 10, the method further comprising:
   recovering, by the processor, an additional resource by utilizing the global catalog in parallel with the recovering the resource and the transaction state by utilizing the current resource definition and the current transaction state.

17. The computer program product of claim 10, the recovering the resource by utilizing a global catalog comprising:
   obtaining, by the processor, an indicator associated with the resource; and
   based on obtaining the indicator, recovering the resource by utilizing a global catalog.

18. A system comprising:
   a memory;
   a processor in communication with the memory; and
   program instructions executable by the processor via the memory to perform a method, the method comprising:
      cataloging, by a processor, a current resource definition and a current transaction state for a resource;
      recovering, by the processor, the resource and a transaction state for the resource after an emergency restart subsequent to one of an immediate shutdown or an abnormal shutdown of the resource, by utilizing the current resource definition and the current transaction state, wherein the recovering comprises recovering transactions of the resource;
      completing or backing out of, by the processor, the transactions;
      closing, by the processor, the resource, comprising:
         verifying, by the processor, that the resource and the transaction state were recovered by utilizing the current resource definition and the current transaction state; and
         based on the verifying, closing the resource; and
      recovering, by the processor, the resource by utilizing a global catalog.

19. The system of claim 18, wherein the transaction state is any type of resource data state that may be recovered by the processor.

* * * * *